US012286132B2

(12) United States Patent
Craig et al.

(10) Patent No.: US 12,286,132 B2
(45) Date of Patent: Apr. 29, 2025

(54) VEHICLE SYSTEMS AND METHODS FOR AUTONOMOUS ROUTE FOLLOWING

(71) Applicant: GM GLOBAL TECHNOLOGY OPERATIONS LLC, Detroit, MI (US)

(72) Inventors: David Allen Craig, Owasso, OK (US); Quan Zhang, Toronto (CA); David E. Bojanowski, Clarkston, MI (US); Yan Nok Cheng, Oshawa (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 333 days.

(21) Appl. No.: 18/063,117

(22) Filed: Dec. 8, 2022

(65) Prior Publication Data
US 2024/0190457 A1 Jun. 13, 2024

(51) Int. Cl.
*B60W 60/00* (2020.01)
*G01C 21/36* (2006.01)

(52) U.S. Cl.
CPC ........... *B60W 60/001* (2020.02); *G01C 21/36* (2013.01); *B60W 2556/50* (2020.02)

(58) Field of Classification Search
CPC ........... B60W 60/001; B60W 2556/50; B60W 40/06; B60W 50/00; B60W 2050/0005; G01C 21/36; G01C 21/3658; G01C 21/30; G01C 21/3461
See application file for complete search history.

(56) References Cited

U.S. PATENT DOCUMENTS

| | | | | |
|---|---|---|---|---|
| 9,188,985 B1* | 11/2015 | Hobbs | ................ | G01C 21/3682 |
| 10,126,137 B2* | 11/2018 | Pickering | ........... | G01C 21/3611 |
| 11,414,130 B2* | 8/2022 | Seegmiller | .............. | H04W 4/02 |
| 11,636,693 B2* | 4/2023 | Niesen | .................... | G06F 18/22 |
| | | | | 382/104 |
| 11,645,854 B2* | 5/2023 | Zhang | ................ | G01C 21/3629 |
| | | | | 701/28 |
| 2013/0096819 A1 | 4/2013 | Tarnok | | |
| 2015/0235140 A1* | 8/2015 | Rothermel | ...... | B60W 30/18163 |
| | | | | 706/52 |
| 2017/0040004 A1* | 2/2017 | He | ........................ | G09G 5/026 |
| 2017/0329330 A1* | 11/2017 | Hatano | ............ | B60W 60/0051 |
| 2017/0329331 A1* | 11/2017 | Gao | .................. | B60W 50/0098 |
| 2018/0058865 A1* | 3/2018 | Takeuchi | ........... | G01C 21/3617 |
| 2020/0109748 A1* | 4/2020 | Carlson | ............... | F02N 11/0807 |
| 2020/0182633 A1* | 6/2020 | Liu | ..................... | G01C 21/3407 |

(Continued)

*Primary Examiner* — Redhwan K Mawari
(74) *Attorney, Agent, or Firm* — Lorenz & Kopf LLP

(57) ABSTRACT

Vehicles and related systems and methods are provided for controlling a vehicle in an autonomous operating mode. One method involves obtaining navigation information for a route for the vehicle from a navigation system, transforming the navigation information into data points defining an upcoming trajectory of the route, mapping the data points to a corresponding mapped set of lane segments encompassing one or more of the data points, assigning lane preference indicia to the mapped set of lane segments, and autonomously operating one or more actuators onboard the vehicle to laterally maneuver the vehicle into one or more lanes at respective longitudinal positions along the route corresponding to one or more lane segments of the mapped set of lane segments in a manner that is influenced by the lane preference indicia assigned to the lane segments.

20 Claims, 4 Drawing Sheets

(56) References Cited

U.S. PATENT DOCUMENTS

| | | | |
|---|---|---|---|
| 2020/0184231 A1* | 6/2020 | Viswanathan | G06F 18/2163 |
| 2020/0232800 A1* | 7/2020 | Bai | G01C 21/3848 |
| 2020/0234585 A1* | 7/2020 | Bai | G08G 1/096725 |
| 2020/0372263 A1* | 11/2020 | Song | G06V 20/588 |
| 2021/0107566 A1* | 4/2021 | Seegmiller | H04W 4/02 |
| 2022/0013014 A1* | 1/2022 | Xu | G01C 21/3691 |

* cited by examiner

VEHICLE SYSTEMS AND METHODS FOR AUTONOMOUS ROUTE FOLLOWING

INTRODUCTION

The technical field generally relates to vehicle systems and more particularly relates to autonomous operation of a vehicle using autonomous driving maps or other navigation maps.

An autonomous vehicle is a vehicle that is capable of sensing its environment and navigating with little or no user input. An autonomous vehicle senses its environment using sensing devices such as radar, lidar, image sensors, and the like. The autonomous vehicle system further uses information from global positioning systems (GPS) technology, navigation systems, vehicle-to-vehicle communication, vehicle-to-infrastructure technology, and/or drive-by-wire systems to navigate the vehicle.

Vehicle automation has been categorized into numerical levels ranging from Zero, corresponding to no automation with full human control, to Five, corresponding to full automation with no human control. Various automated driver-assistance systems, such as cruise control, adaptive cruise control, and parking assistance systems correspond to lower automation levels, while true "driverless" vehicles correspond to higher automation levels.

Vehicle navigation systems have been used to guide a driver along a determined route to a destination. Current navigation systems provide for various route preferences settings to be selected such as preferring highways or land routes. Various different suppliers provide navigation systems or services exist that provide turn-by-turn navigation or other route-based navigation in various different formats.

To support autonomous driving, surveys are performed on roads in order to generate autonomous driving road data to support autonomous driving features, usually referred to as high-definition (HD) maps or autonomous driving maps. Currently, the autonomous road data is made using surveying techniques that combine LiDAR scanning with differential GPS. Not all roads have been surveyed and thus such precise autonomous road data will be lacking. Such detailed autonomous road data can be used for autonomous vehicle control. In time, more and more roads will be surveyed to make the roads autonomous vehicle suitable. Accordingly, it is desirable to provide automated driving systems adapted for autonomous driving using turn-by-turn navigation or other route-based navigation provided by a navigation system or service independent of the supplier or format of the navigation information. Other desirable features and characteristics of the present invention will become apparent from the subsequent detailed description and the appended claims, taken in conjunction with the accompanying drawings and the foregoing technical field and background.

SUMMARY

Apparatus for a vehicle and related methods for controlling the vehicle in an autonomous operating mode are provided. One method of controlling a vehicle in an autonomous operating mode involves obtaining navigation information for a route for the vehicle from a navigation system, transforming the navigation information into a first set of data points defining an upcoming trajectory of the route, mapping, by a controller associated with the vehicle, the first set of data points to a corresponding set of lane segments encompassing one or more data points of the first set of data points, resulting in a mapped set of lane segments, assigning, at the controller, lane preference indicia to the mapped set of lane segments, and autonomously operating, by the controller, one or more actuators onboard the vehicle to maneuver the vehicle into one or more lanes at respective positions along the route corresponding to one or respective lane segments of the mapped set of lane segments at the respective positions along the route in a manner that is influenced by the lane preference indicia assigned to the one or more respective lane segments.

In one aspect, mapping the first set of data points to the corresponding set of lane segments involves identifying a respective lane segment of the mapped set of lane segments encompassing a respective data point of the first set of data points. In a further aspect, identifying the respective lane segment involves querying autonomous driving map data using a geographic location associated with the respective data point ahead of a current vehicle location to identify the respective lane segment ahead of the current vehicle location having a geographic area that encompasses the geographic location associated with the respective data point, wherein the geographic area is associated with a region defined by a plurality of georeferenced data points of the autonomous driving map data assigned to the respective lane segment. In another aspect, assigning the lane preference indicia involves assigning a preferred lane indication to the respective lane segment encompassing the respective data point ahead of a current vehicle location. In some aspects, assigning the lane preference indicia further involves assigning non-preferred lane indicia to a second lane segment laterally adjacent to the respective lane segment at a longitudinal position along the route corresponding to the respective data point ahead of the current vehicle location.

In another aspect, transforming the navigation information involves interpolating between data points of the navigation information using an advanced driver-assistance system (ADAS) navigation map data set to obtain a transformed set of georeferenced data points corresponding to the navigation information in an ADAS format. In a further aspect, the data points of the navigation information include at least one of turn-by-turn navigation or road level connectivity. In some aspects, mapping the first set of data points to the corresponding set of lane segments involves identifying a respective lane segment of the mapped set of lane segments encompassing a respective georeferenced data point of the transformed set of georeferenced data points based at least in part on a geographic area associated with the respective lane segment defined by a plurality of georeferenced data points of an autonomous driving map data set assigned to the respective lane segment.

In another aspect, the method involves determining, by a guidance system of the controller, a lateral motion plan for the vehicle based on the first set of data points defining the upcoming trajectory of the route using the lane preference indicia, wherein autonomously operating the one or more actuators involves autonomously operating the one or more actuators to laterally maneuver the vehicle into a lane associated with a respective lane segment of the mapped set of lane segments at a longitudinal position along the route corresponding to the respective lane segment in accordance with the lateral motion plan.

In one or more implementations, the navigation information includes turn-by-turn navigation in a first domain associated with a first navigation map data set, the first set of data points define the upcoming trajectory of the route in a second domain associated with a second navigation map data set different from the first navigation map data set, and the first navigation map data set and the second navigation map data set are independent from one another. In some implementations, at least one of a source or a format associated with the navigation information is different from a second source or a second format associated with the first set of data points.

In another aspect, a non-transitory computer-readable medium is provided that includes executable instructions that, when executed by a processor, cause the processor to obtain navigation information for a route for a vehicle from a navigation system, transform the navigation information into a first set of data points defining an upcoming trajectory of the route, map the first set of data points to a corresponding set of lane segments encompassing one or more data points of the first set of data points, resulting in a mapped set of lane segments, assign lane preference indicia to the mapped set of lane segments, and autonomously operate one or more actuators onboard the vehicle to maneuver the vehicle into one or more lanes at respective positions along the route corresponding to one or more respective lane segments of the mapped set of lane segments at the respective positions along the route in a manner that is influenced by the lane preference indicia assigned to the one or more respective lane segments.

In one aspect, mapping the first set of data points to the corresponding set of lane segments involves identifying a respective lane segment of the mapped set of lane segments encompassing a respective data point of the first set of data points. In a further aspect, assigning the lane preference indicia involves assigning a preferred lane indication to the respective lane segment encompassing the respective data point. In another aspect, transforming the navigation information involves interpolating between data points of the navigation information using an advanced driver-assistance system (ADAS) navigation map data set to obtain a transformed set of georeferenced data points corresponding to the navigation information in an ADAS format. In a further aspect, the data points of the navigation information comprise at least one of turn-by-turn navigation or road level connectivity. In a further aspect, mapping the first set of data points to the corresponding set of lane segments involves identifying a respective lane segment of the mapped set of lane segments encompassing a respective georeferenced data point of the transformed set of georeferenced data points based at least in part on a geographic area associated with the respective lane segment defined by a plurality of georeferenced data points of an autonomous driving map data set assigned to the respective lane segment.

In another aspect, a vehicle is provided that includes one or more actuators onboard the vehicle, an electronic device including a transformation module to obtain navigation information for a route and transform the navigation information into a first set of data points defining an upcoming trajectory of the route, and a controller coupled to the electronic device and the one or more actuators that, by a processor, maps the first set of data points to a corresponding set of lane segments encompassing one or more data points of the first set of data points, resulting in a mapped set of lane segments, assigns lane preference indicia to the mapped set of lane segments and autonomously operates the one or more actuators to maneuver the vehicle into one or more lanes at respective positions along the route corresponding to one or more respective lane segments of the mapped set of lane segments at the respective positions along the route in a manner that is influenced by the lane preference indicia assigned to the one or more respective lane segments. In one aspect, the vehicle includes data storage maintaining an autonomous driving map data set, wherein the controller queries the autonomous driving map data set using a geographic location associated with the respective data point to identify a respective lane segment of the mapped set of lane segments having a geographic area that encompasses the geographic location associated with the respective data point, wherein the geographic area is associated with a region defined by a plurality of georeferenced data points of the autonomous driving map data set assigned to the respective lane segment. In another aspect, the controller includes a guidance system configurable to determine a lateral motion plan for the vehicle based on the first set of data points defining the upcoming trajectory of the route using the lane preference indicia, wherein autonomously operating the one or more actuators involves autonomously operating the one or more actuators to laterally maneuver the vehicle into a lane associated with a respective lane segment of the mapped set of lane segments at a longitudinal position along the route corresponding to the respective lane segment in accordance with the lateral motion plan.

BRIEF DESCRIPTION OF THE DRAWINGS

The exemplary aspects will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding introduction, summary, or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Figure 1:
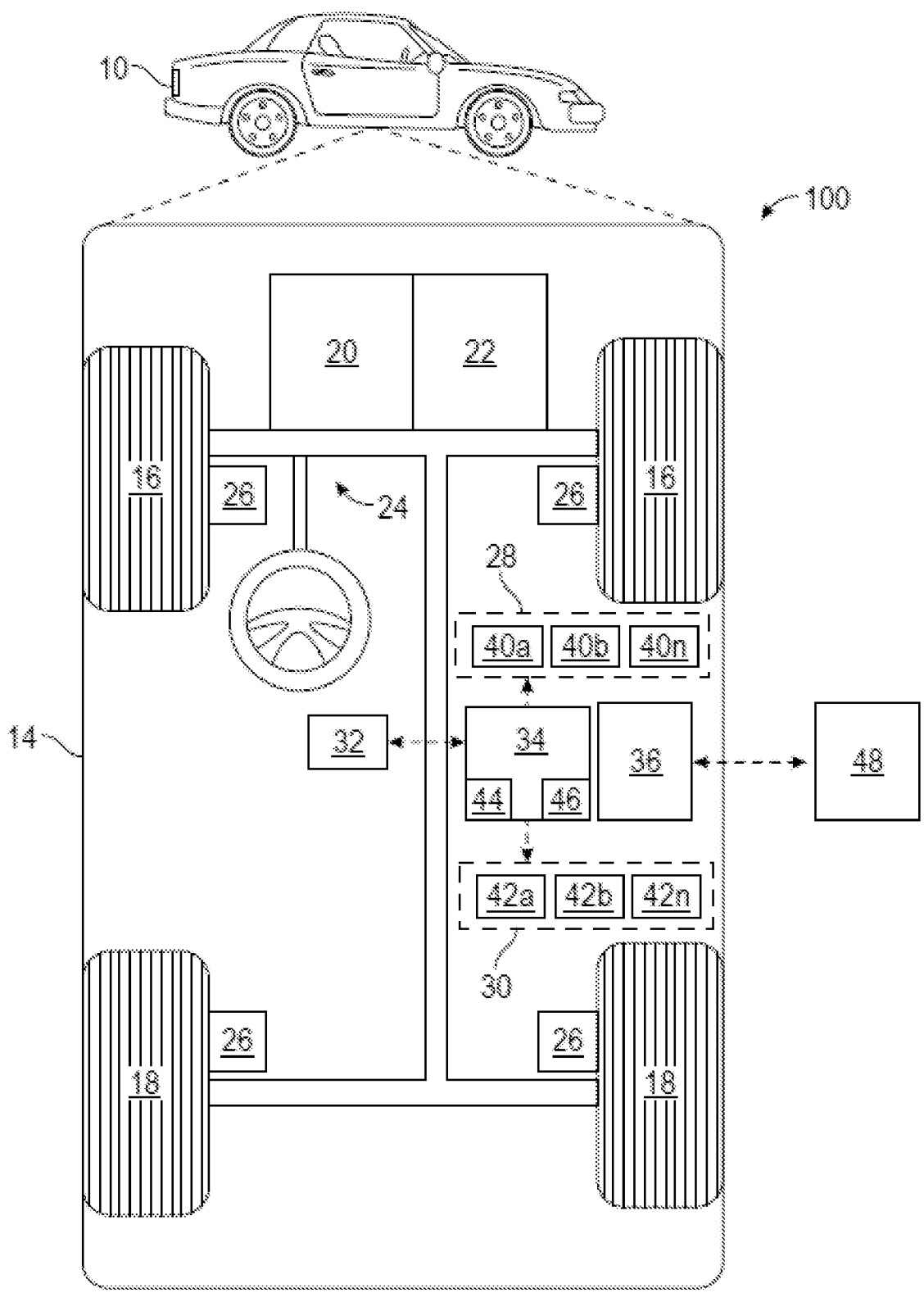
FIG. 1 is a block diagram illustrating an autonomous vehicle control system for a vehicle in accordance with various implementations.

Referring now to FIG. 1, in accordance with one or more implementations, an autonomous vehicle control system 100 determines a plan for autonomously operating a vehicle 10 along a route in a manner that accounts for objects or obstacles detected by onboard sensors 28, 40, as described in greater detail below. In this regard, a control module onboard the vehicle 10 calibrates different types of onboard sensors 28, 40 with respect to one another and/or the vehicle 10, thereby allowing data from those different types of onboard sensors 28, 40 to be spatially associated or otherwise used with one another based on the calibration for purposes of object detection, object classification, and the resulting autonomous operation of the vehicle 10.

As depicted in FIG. 1, the vehicle 10 generally includes a chassis, a body 14, and front and rear wheels 16, 18 rotationally coupled to the chassis near a respective corner of the body 14. The body 14 is arranged on the chassis and substantially encloses components of the vehicle 10, and the body 14 and the chassis may jointly form a frame.

In exemplary implementations, the vehicle 10 is an autonomous vehicle or is otherwise configured to support one or more autonomous operating modes, and the control system 100 is incorporated into the vehicle 10 (hereinafter referred to as the vehicle 10). The vehicle 10 is depicted in the illustrated implementation as a passenger car, but it should be appreciated that any other vehicle including motorcycles, trucks, sport utility vehicles (SUVs), recreational vehicles (RVs), marine vessels, aircraft, etc., can also be used. In an exemplary implementation, the vehicle 10 is a so-called Level Two automation system. A Level Two system indicates "partial driving automation," referring to the driving mode-specific performance by an automated driving system to control steering, acceleration and braking in specific scenarios while a driver remains alert and actively supervises the automated driving system at all times and is capable of providing driver support to control primary driving tasks.

As shown, the vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in various implementations, include an internal combustion engine, an electric machine such as a traction motor, and/or a fuel cell propulsion system. The transmission system 22 is configured to transmit power from the propulsion system 20 to the vehicle wheels 16, 18 according to selectable speed ratios. According to various implementations, the transmission system 22 may include a step-ratio automatic transmission, a continuously variable transmission, or other appropriate transmission. The brake system 26 is configured to provide braking torque to the vehicle wheels 16, 18. The brake system 26 may, in various implementations, include friction brakes, brake by wire, a regenerative braking system such as an electric machine, and/or other appropriate braking systems. The steering system 24 influences a position of the of the vehicle wheels 16, 18. While depicted as including a steering wheel for illustrative purposes, in some implementations contemplated within the scope of the present disclosure, the steering system 24 may not include a steering wheel.

The sensor system 28 includes one or more sensing devices 40a-40n that sense observable conditions of the exterior environment and/or the interior environment of the vehicle 10. The sensing devices 40a-40n can include, but are not limited to, radars, lidars, global positioning systems, optical cameras, thermal cameras, ultrasonic sensors, and/or other sensors. The actuator system 30 includes one or more actuator devices 42a-42n that control one or more vehicle features such as, but not limited to, the propulsion system 20, the transmission system 22, the steering system 24, and the brake system 26. In various implementations, the vehicle features can further include interior and/or exterior vehicle features such as, but are not limited to, doors, a trunk, and cabin features such as air, music, lighting, etc. (not numbered).

The data storage device 32 stores data for use in automatically controlling the vehicle 10. In various implementations, the data storage device 32 stores defined maps of the navigable environment. In various implementations, the defined maps may be predefined by and obtained from a remote system. For example, the defined maps may be assembled by the remote system and communicated to the vehicle 10 (wirelessly and/or in a wired manner) and stored in the data storage device 32. As can be appreciated, the data storage device 32 may be part of the controller 34, separate from the controller 34, or part of the controller 34 and part of a separate system.

The controller 34 includes at least one processor 44 and a computer readable storage device or media 46. The processor 44 can be any custom made or commercially available processor, a central processing unit (CPU), a graphics processing unit (GPU), an auxiliary processor among several processors associated with the controller 34, a semiconductor-based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the vehicle 10.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the vehicle 10, and generate control signals to the actuator system 30 to automatically control the components of the vehicle 10 based on the logic, calculations, methods, and/or algorithms. Although only one controller 34 is shown in FIG. 1, implementations of the vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the vehicle 10. In various implementations, one or more instructions of the controller 34 are embodied in the control system 100 (e.g., in data storage element 46) and, when executed by the processor 44, cause the processor 44 to obtain data captured or generated from imaging and ranging devices 40 and utilize the captured environmental data to determine commands for autonomously operating the vehicle 10, as described in greater detail below.

Still referring to FIG. 1, in exemplary implementations, the communication system 36 is configured to wirelessly communicate information to and from other entities 48 over a communication network, such as but not limited to, other vehicles ("V2V" communication.) infrastructure ("V2I" communication), remote systems, and/or personal devices. In an exemplary implementation, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The communication network utilized by the communication system 36 can include a wireless carrier system such as a cellular telephone system that includes a plurality of cell towers (not shown), one or more mobile switching centers (MSCs) (not shown), as well as any other networking components required to connect the wireless carrier system with a land communications system, and the wireless carrier system can implement any suitable communications technology, including for example, digital technologies such as CDMA (e.g., CDMA2000), LTE (e.g., 4G LTE or 5G LTE), GSM/GPRS, or other current or emerging wireless technologies. Additionally, or alternatively, a second wireless carrier system in the form of a satellite communication system can be utilized to provide uni-directional or bi-directional communication using one or more communication satellites (not shown) and an uplink transmitting station (not shown), including, but not limited to satellite radio services, satellite telephony services and/or the like. Some implementations may utilize a land communication system, such as a conventional land-based telecommunications network including a public switched telephone network (PSTN) used to provide hardwired telephony, packet-switched data communications, and the Internet infrastructure. One or more segments of a land communication system can be implemented using a standard wired network, a fiber or other optical network, a cable network, power lines, other wireless networks such as wireless local area networks (WLANs), or networks providing broadband wireless access (BWA), or any combination thereof.

Figure 2:
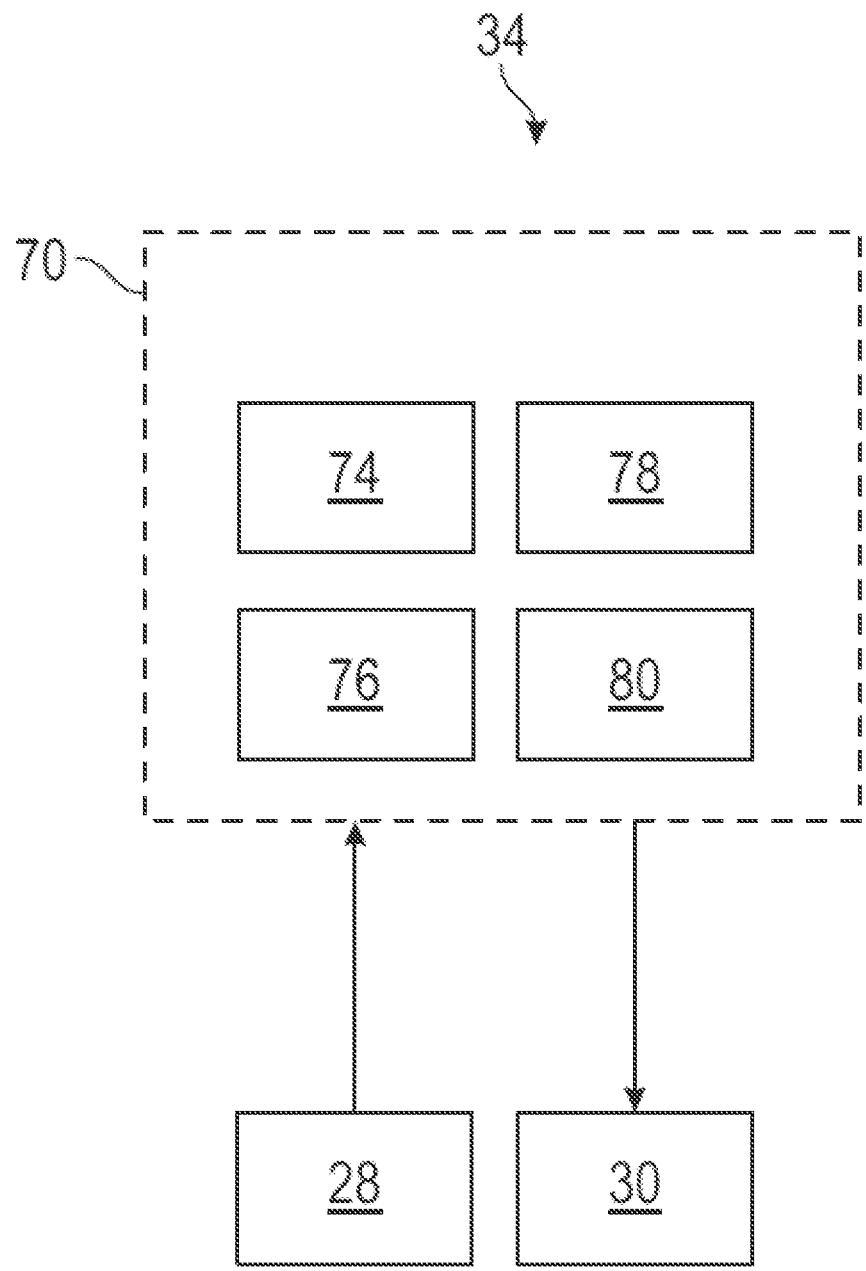
FIG. 2 is a block diagram of an automated driving system (ADS) suitable for implementation by the autonomous vehicle control system of the vehicle of FIG. 1 in accordance with various implementations.

Referring now to FIG. 2, in accordance with various implementations, controller 34 implements an autonomous driving system (ADS) 70. That is, suitable software and/or hardware components of controller 34 (e.g., processor 44 and computer-readable storage device 46) are utilized to provide an autonomous driving system 70 that is used in conjunction with vehicle 10, for example, to automatically control various actuators 30 and thereby control vehicle acceleration, steering, and braking, respectively, without human intervention.

In various implementations, the instructions of the autonomous driving system 70 may be organized by function or system. For example, as shown in FIG. 2, the autonomous driving system 70 can include a sensor fusion system 74, a positioning system 76, a guidance system 78, and a vehicle control system 80. As can be appreciated, in various implementations, the instructions may be organized into any number of systems (e.g., combined, further partitioned, etc.) as the disclosure is not limited to the present examples.

In various implementations, the sensor fusion system 74 synthesizes and processes sensor data and predicts the presence, location, classification, and/or path of objects and features of the environment of the vehicle 10. In various implementations, the sensor fusion system 74 can incorporate information from multiple sensors, including but not limited to cameras, lidars, radars, and/or any number of other types of sensors. In one or more exemplary implementations described herein, the sensor fusion system 74 correlates image data to lidar point cloud data, the vehicle reference frame, or some other reference coordinate frame using calibrated conversion parameter values associated with the pairing of the respective camera and reference frame to relate lidar points to pixel locations, assign depths to the image data, identify objects in one or more of the image data and the lidar data, or otherwise synthesize associated image data and lidar data. In other words, the sensor output from the sensor fusion system 74 provided to the vehicle control system 80 (e.g., indicia of detected objects and/or their locations relative to the vehicle 10) reflects or is otherwise influenced by the calibrations and associations between camera images, lidar point cloud data, and the like.

The positioning system 76 processes sensor data along with other data to determine a position (e.g., a local position relative to a map, an exact position relative to lane of a road, vehicle heading, velocity, etc.) of the vehicle 10 relative to the environment. The guidance system 78 processes sensor data along with other data to determine a path for the vehicle 10 to follow given the current sensor data and vehicle pose. The vehicle control system 80 then generates control signals for controlling the vehicle 10 according to the determined path. In various implementations, the controller 34 implements machine learning techniques to assist the functionality of the controller 34, such as feature detection/classification, obstruction mitigation, route traversal, mapping, sensor integration, ground-truth determination, and the like.

In one or more implementations, the guidance system 78 includes a motion planning module that generates a motion plan for controlling the vehicle as it traverses along a route. The motion planning module includes a longitudinal solver module that generates a longitudinal motion plan output for controlling the movement of the vehicle along the route in the general direction of travel, for example, by causing the vehicle to accelerate or decelerate at one or more locations in the future along the route to maintain a desired speed or velocity. The motion planning module also includes a lateral solver module that generates a lateral motion plan output for controlling the lateral movement of the vehicle along the route to alter the general direction of travel, for example, by steering the vehicle at one or more locations in the future along the route (e.g., to maintain the vehicle centered within a lane, change lanes, etc.). The longitudinal and lateral plan outputs correspond to the commanded (or planned) path output provided to the vehicle control system 80 for controlling the vehicle actuators 30 to achieve movement of the vehicle 10 along the route that corresponds to the longitudinal and lateral plans.

During normal operation, the longitudinal solver module attempts to optimize the vehicle speed (or velocity) in the direction of travel, the vehicle acceleration in the direction of travel, and the derivative of the vehicle acceleration in the direction of travel, alternatively referred to herein as the longitudinal jerk of the vehicle, and the lateral solver module attempts to optimize one or more of the steering angle, the rate of change of the steering angle, and the acceleration or second derivative of the steering angle, alternatively referred to herein as the lateral jerk of the vehicle. In this regard, the steering angle can be related to the curvature of the path or route, and any one of the steering angle, the rate of change of the steering angle, and the acceleration or second derivative of the steering angle can be optimized by the lateral solver module, either individually or in combination.

In an exemplary implementation, the longitudinal solver module receives or otherwise obtains the current or instantaneous pose of the vehicle, which includes the current position or location of the vehicle, the current orientation of the vehicle, the current speed or velocity of the vehicle, and the current acceleration of the vehicle. Using the current position or location of the vehicle, the longitudinal solver module also retrieves or otherwise obtains route information which includes information about the route the vehicle is traveling along given the current pose and plus some additional buffer distance or time period (e.g., 12 seconds into the future), such as, for example, the current and future road grade or pitch, the current and future road curvature, current and future lane information (e.g., lane types, boundaries, and other constraints or restrictions), as well as other constraints or restrictions associated with the roadway (e.g., minimum and maximum speed limits, height or weight restrictions, and the like). In one or more implementations, the lateral route information may include the planned lateral path command output by the lateral solver module, where the longitudinal and lateral solver modules iteratively derive an optimal travel plan along the route.

The longitudinal solver module also receives or otherwise obtains the current obstacle data relevant to the route and current pose of the vehicle, which may include, for example, the location or position, size, orientation or heading, speed, acceleration, and other characteristics of objects or obstacles in a vicinity of the vehicle or the future route. The longitudinal solver module also receives or otherwise obtains longitudinal vehicle constraint data which characterizes or otherwise defines the kinematic or physical capabilities of the vehicle for longitudinal movement, such as, for example, the maximum acceleration and the maximum longitudinal jerk, the maximum deceleration, and the like. The longitudinal vehicle constraint data may be specific to each particular vehicle and may be obtained from an onboard data storage element 32 or from a networked database or other entity 48. In some implementations, the longitudinal vehicle constraint data may be calculated or otherwise determined dynamically or substantially in real-time based on the current mass of the vehicle, the current amount of fuel onboard the vehicle, historical or recent performance of the vehicle, and/or potentially other factors. In one or more implementations, the longitudinal vehicle constraint data is calculated or determined in relation to the lateral path, the lateral vehicle constraint data, and/or determinations made by the lateral solver module. For example, the maximum longitudinal speed may be constrained at a particular location by the path curvature and the maximum lateral acceleration by calculating the maximum longitudinal speed as a function of the path curvature and the maximum lateral acceleration (which itself could be constrained by rider preferences or vehicle dynamics). In this regard, at locations where the degree of path curvature is relatively high (e.g., sharp turns), the maximum longitudinal speed may be limited accordingly to maintain comfortable or achievable lateral acceleration along the curve.

Using the various inputs to the longitudinal solver module, the longitudinal solver module calculates or otherwise determines a longitudinal plan (e.g., planned speed, acceleration and jerk values in the future as a function of time) for traveling along the route within some prediction horizon (e.g., 12 seconds) by optimizing some longitudinal cost variable or combination thereof (e.g., minimizing travel time, minimizing fuel consumption, minimizing jerk, or the like) by varying the speed or velocity of the vehicle from the current pose in a manner that ensures the vehicle complies with longitudinal ride preference information to the extent possible while also complying with lane boundaries or other route constraints and avoiding collisions with objects or obstacles. In this regard, in many conditions, the resulting longitudinal plan generated by the longitudinal solver module does not violate the maximum vehicle speed, the maximum vehicle acceleration, the maximum deceleration, and the maximum longitudinal jerk settings associated with the user, while also adhering to the following distances or buffers associated with the user. That said, in some scenarios, violating one or more longitudinal ride preference settings may be necessary to avoid collisions, comply with traffic signals, or the like, in which case, the longitudinal solver module may attempt to maintain compliance of as many of the user-specific longitudinal ride preference settings as possible. Thus, the resulting longitudinal plan generally complies with the user's longitudinal ride preference information but does not necessarily do so strictly.

In a similar manner, the lateral solver module receives or otherwise obtains the current vehicle pose and the relevant route information and obstacle data for determining a lateral travel plan solution within the prediction horizon. The lateral solver module also receives or otherwise obtains lateral vehicle constraint data which characterizes or otherwise defines the kinematic or physical capabilities of the vehicle for lateral movement, such as, for example, the maximum steering angle or range of steering angles, the minimum turning radius, the maximum rate of change for the steering angle, and the like. The lateral vehicle constraint data may also be specific to each particular vehicle and may be obtained from an onboard data storage element 32 or from a networked database or other entity 48. The lateral solver module may also receive or otherwise obtain user-specific lateral ride preference information which includes, for example, user-specific values or settings for the steering rate (e.g., a maximum rate of change for the steering angle, a maximum acceleration of the steering angle, and/or the like), the lateral jerk, and the like. The lateral ride preference information may also include user-specific distances or buffers, such as, for example, a minimum and/or maximum distance from lane boundaries, a minimum lateral buffer or lateral separation distance between objects or obstacles, and the like, and potentially other user-specific lane preferences (e.g., a preferred lane of travel).

Using the various inputs to the lateral solver module, the lateral solver module calculates or otherwise determines a lateral plan for traveling along the route at future locations within some prediction horizon (e.g., 50 meters) by optimizing some lateral cost variable or combination thereof (e.g., minimizing deviation from the center of the roadway, minimizing the curvature of the path, minimizing lateral jerk, or the like) by varying the steering angle or vehicle wheel angle in a manner that ensures the vehicle complies with the lateral ride preference information to the extent possible while also complying with lane boundaries or other route constraints and avoiding collisions with objects or obstacles.

During normal operation, the lateral solver module may utilize the longitudinal travel plan from the longitudinal solver module along with the route information and obstacle data to determine how to steer the vehicle from the current pose within the prediction horizon while attempting to comply with the lateral ride preference information. In this regard, the resulting longitudinal and lateral travel plans that are ultimately output by the motion planning module comply with as many of the user's ride preferences as possible while optimizing the cost variable and avoiding collisions by varying one or more of the vehicle's velocity, acceleration/deceleration (longitudinally and/or laterally), jerk (longitudinally and/or laterally), steering angle, and steering angle rate of change. The longitudinal travel plan output by the motion planning module includes a sequence of planned velocity and acceleration commands with respect to time for operating the vehicle within the longitudinal prediction horizon (e.g., a velocity plan for the next 12 seconds), and similarly, the lateral travel plan output by the motion planning module includes a sequence of planned steering angles and steering rates with respect to distance or position for steering the vehicle within the lateral prediction horizon while operating in accordance with the longitudinal travel plan (e.g., a steering plan for the next 50 meters). The longitudinal and lateral plan outputs are provided to the vehicle control system 80, which may utilize vehicle localization information and employs its own control schemes to generate control outputs that regulate the vehicle localization information to the longitudinal and lateral plans by varying velocity and steering commands provided to the actuators 30, thereby varying the speed and steering of the vehicle 10 to emulate or otherwise effectuate the longitudinal and lateral plans.

In exemplary implementations, the guidance system 78 supports a hands-free autonomous operating mode that controls steering, acceleration and braking while it is enabled and operating to provide lane centering while attempting to maintain a driver-selected speed and/or following distance (or gap time) relative to other vehicles using the current sensor data (or obstacle data) provided by the sensor fusion system 74 and the current vehicle pose provided by the positioning system 76. In the autonomous operating mode, the guidance system 78 includes or otherwise implements a lane change coordinator that analyzes route information (if available) in addition to data or other information from the sensor fusion system 74, the positioning system 76 and potentially other modules or systems to determine whether or not to initiate and execute a lane change from a current lane of travel to an adjacent lane of travel, for example, based on presence of slower moving traffic within the current lane of travel ahead of the vehicle (e.g., to overtake or pass another vehicle), whether or not the current lane is ending or merging into an adjacent lane, whether a lane change is required to maintain travel along the desired route, and/or the like. In this regard, the lane change coordinator may automatically determine when to initiate a lane change and automatically configure the lateral solver module and/or the motion planning module to generate a corresponding lateral plan to change lanes in the desired manner and provide the lateral plan to the vehicle control system 80, which automatically generates corresponding control signals for autonomously controlling the vehicle actuators 30 to maneuver the vehicle 10 and execute the lane change.

Figure 3:
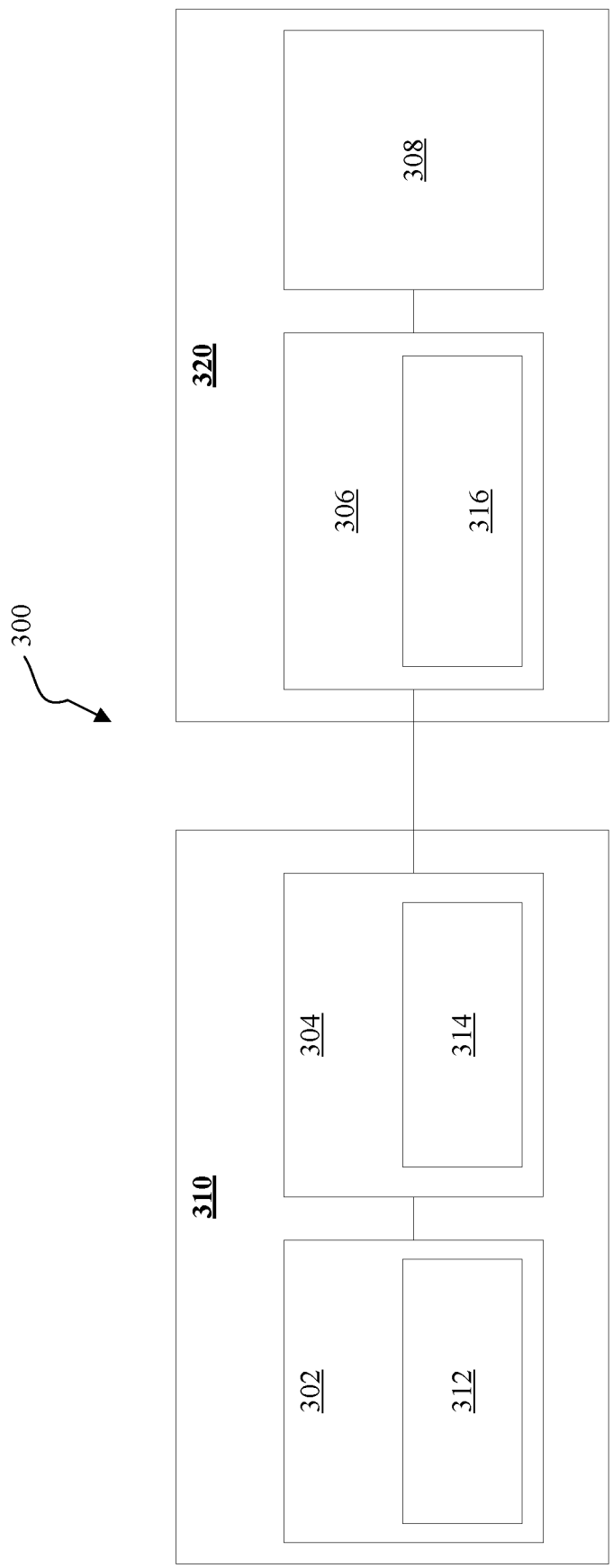
FIG. 3 depicts a block diagram of an autonomous vehicle control system that is suitable for use with the ADS of FIG. 2 in the autonomous vehicle control system of FIG. 1 according to one or more aspects described herein.

Referring now to FIG. 3, with continued reference to FIGS. 1-2, in exemplary implementations, a vehicle control system 300 includes a navigation system 302 that outputs or otherwise provides navigation information that defines a route for a vehicle to follow to a transformation module 304 that transforms or otherwise translates the navigation information from its initial format or protocol in a navigation map domain into a transformed set of georeferenced data points that defines the upcoming trajectory of the route with a desired geospatial resolution and is in a format or protocol suitable for consumption by an ADS 320 (e.g., ADS 70). The transformed set of data points is transmitted or otherwise provided from the transformation module 304 to a lane mapping module 306 of the ADS 320 that maps or otherwise converts individual georeferenced data points of the upcoming trajectory into corresponding lane segments that encompass the respective geographic location associated with the respective data point, resulting in a mapped set of lane segments corresponding to the transformed set of data points defining the upcoming trajectory of the route. The lane mapping module 306 assigns lane preference indicia to the mapped set of lane segments and provides the lane preference information to a guidance system 308 associated with an automated driving system (ADS) 320 (e.g., guidance system 78 of ADS 70), which, in turn, utilizes the mapped set of preferred lane segments corresponding to the upcoming trajectory for the route in conjunction with the received navigation information to autonomously operate one or more actuators (e.g., actuators 30) onboard a vehicle to laterally maneuver the vehicle into the preferred lane segments at respective longitudinal positions along the route, and thereby, autonomously follows the route provided by the navigation system 302 using the lane preference indicia and the route information (e.g., road identifiers and the like) independent of the format, quality or characteristics of the navigation information initially provided by the navigation system 302.

The navigation system 302 generally represents the combination of navigational map data and related processes or services that are configured to determine a route to a destination from a starting location (e.g., the vehicle's initial or current location) and output navigation information that defines the route in a particular format associated with or otherwise supported by the navigation system 302 based on a set of navigation map data 312 (or a navigation map database) associated with the navigation system 302. In this regard, in practice, the navigation system 302 and/or the navigation map data 312 could be provided by any number of different third party suppliers or providers, or include or otherwise incorporate any number of different software applications or services provided by any number of different third party suppliers or providers, which could be accessed locally at the vehicle or remotely via a communications network (e.g., via a remote server or other cloud-based system).

In the illustrated implementation, at least a portion of the navigation system 302 is implemented by or at an electronic device 310 that includes one or more user interfaces adapted to allow a user to input or otherwise define a desired destination location for the route along with other user preferences with respect to the route. For purposes of explanation, the electronic device 310 may alternatively be referred to herein as a vehicle cockpit unit (VCU) that is communicatively coupled to the ADS 320 of the vehicle via a communications bus. That said, in various implementations, the electronic device 310 may be realized as any sort of infotainment module, navigation head unit, or another similar or suitable unit that resides onboard the vehicle, and which may be integrated into a dashboard or other console within a passenger compartment of the vehicle. That said, in other implementations, the electronic device 310 may be realized as a mobile device or other computing device that is distinct or separate from the vehicle but communicatively coupled to the ADS 320 (or controller 34) (e.g., via a wireless communications network). In yet other implementations, the navigation system 302 may be implemented by or at a remote server or other remote computing system (e.g., at remote entity 48) that provides navigation information to the VCU 310 or another device onboard or otherwise associated with the vehicle over a communications network.

In one or more exemplary implementations, the navigation system 302 includes a navigation processor or other route determination module to process map data from one or more sources of navigational map data 312 to determine a path for a route and output corresponding navigation instructions. In this regard, the navigational map data 312 may be a machine to human map in that it is designed to be displayed for understanding and visualization by a human via a display device for the purpose of a driver navigating a vehicle. For example, the navigational map data 312 may include one or more different individual layers, such as, without limitation, elevation data, hydrography data, boundaries data, land use area data and navigation roads, which may be georeferenced and aligned to each other and merged together or stacked to create one navigation map. The navigation system 302 may provide a user interface for receiving an input from a user, including, but not limited to, a desired destination for the vehicle and other navigation preferences from the user (e.g., via a navigation settings menu).

The route determination module of the navigation system 302 utilizes the navigation map data 312 to determine a route to the desired destination in accordance with the user's navigation preferences or other navigation settings (e.g., fastest route, shortest route, cheapest route that avoids tolls, etc.), and in some implementations, allows a user to choose one of a list of alternative routes. The navigation system 302 outputs or otherwise provides navigation information that includes routing data corresponding to the resulting route determined by the navigation system 302 or otherwise selected by the user. Depending on the implementation, the navigation information output by the navigation system 302 may be realized as or otherwise configured to provide turn-by-turn navigation (e.g., turn cards), advanced driver-assistance system (ADAS) navigation, map information service, or any other similar or suitable navigation that defines the upcoming trajectory for the route.

The transformation module 304 generally represents the component of the system 300 that resides at the VCU 310 and is configurable to transform, translate or otherwise convert the navigation information provided by the navigation system 302 in a format or protocol corresponding to the navigation map data 312 into a uniform format or protocol suitable for ingestion by the ADS 320. In this regard, the transformation module 304 provides interoperability between the ADS 320 and the navigation system 302 independent of the provider or supplier associated with the navigation system 302, the navigation map data 312 or the format or type of navigation information provided by the navigation system 302, thereby allowing the ADS 320 to autonomously follow a route provided by the navigation system 302 independent of the provider, supplier or underlying data source associated with a third-party navigation system 302. In exemplary implementations, the transformation module 304 is implemented or otherwise realized as a software development kit (SDK) or other software component that is executed or otherwise generated based on code or other computer-executable programming instructions that are stored at the VCU 310 or otherwise accessible by a processor of the VCU 310.

As described in greater detail below, in one or more implementations, the transformation module 304 includes or otherwise accesses a set of ADAS map data 314 (which may be stored or otherwise maintained in a data storage associated with the VCU 310) to establish georeferenced correlations between the navigation information provided by the navigation system 302 and the ADAS map data 314 to transform the received navigation information into a corresponding set of georeferenced data points in the ADAS map domain that define the upcoming trajectory of the route determined by the navigation system 302. In addition to road level map data and road level connectivity information, the ADAS map data 314 includes additional attributes associated with respective georeferenced data points of the ADAS map data 314 at the respective geographic location, such as, for example, curvature of the road, traffic control signage, lane count, and the like. To transform the navigation information from the navigation map domain into corresponding georeferenced data points in the ADAS map domain, the transformation module 304 maps or otherwise identifies a corresponding georeferenced data point in the ADAS map data 314 that is closest to a corresponding georeferenced data point along the upcoming trajectory of the route that was derived from the navigation map data 312 and defined by the navigation information for the route, for example, by minimizing the geographic distance between a georeferenced data point of the navigation map data 312 associated with the route and a nearest georeferenced data point in the ADAS map data 314 for each georeferenced data point associated with the route to arrive at a corresponding set of georeferenced data points of the ADAS map data 314 that define the upcoming trajectory of the route in the ADAS map domain. In this manner, the transformation module 304 determines a stream of sequentially arranged georeferenced data points that define the upcoming trajectory for at least a portion of the route to be transmitted, communicated or otherwise provided to the ADS 320. In this regard, the sequence of data points provide a reference trajectory line having associated attributes (e.g., road curvature, traffic control signage, lane count, etc.) derived from the ADAS map data 314.

In one or more implementations, after obtaining a corresponding set of georeferenced data points that define the upcoming trajectory of the route in the ADAS map domain, in one or more implementations, the transformation module 304 interpolates or downsamples between georeferenced data points to arrive at a transformed set of georeferenced data points having the desired density or geospatial resolution between successive georeferenced data points that define the upcoming trajectory of the route in the ADAS map domain. In this regard, depending on the current operating context for the vehicle (e.g., the vehicle speed, the road type, the road curvature, and/or the like), the transformation module 304 increases or decreases the number of georeferenced data points utilized to define the upcoming trajectory of the route. For example, for a route along a highway or other road having a relatively higher speed, relatively lower curvature, relatively fewer intersections, and/or the like, the transformation module 304 may downsample or increase the geospatial resolution between successive georeferenced data points up to a maximum threshold geographic distance between successive georeferenced data points of the route (e.g., six kilometers). On the other hand, for a route traversing roads having a relatively lower speed, relatively higher curvature, relatively higher number of intersections, and/or the like, the transformation module 304 may interpolate or decrease the geospatial resolution between successive georeferenced data points up to achieve a desired geographic distance between successive georeferenced data points of the route based on the current operating context. In this regard, some implementations may calculate or otherwise determine a targeted geographic distance between successive georeferenced data points of the route as a function of the current or expected vehicle speed, the current or expected road curvature, the current or expected road type, and/or other parameters or variables characterizing the operating context.

Still referring to FIG. 3, in exemplary implementations, the lane mapping module 306 of the ADS 320 includes or otherwise access autonomous driving map (or high-definition map) data 316, which may be stored or otherwise maintained in a data storage associated with the ADS 320 (e.g., in a storage medium 46 associated with the controller 34) or retrieved from a remote source (e.g., remote entity 48). The autonomous driving map data 316 may be more granular or detailed than the ADAS map data 314 with a higher resolution or density of georeferenced data points created from detailed surveys of roads, for example, using range finding scanning devices, such as Lidar devices, and differential or conventional GPS measurements. In exemplary implementations, the autonomous driving map data 316 provides lane level map data for every lane or line on a road represented or captured in the set of autonomous driving map data 316, including lane level map geometry (e.g., latitude, longitude, elevation, curvature, road edges and lane boundaries, etc.) and lane level map attributes (e.g., type of lane line, crosswalks, stop bars, speed limit signs, stop signs, yield signs, traffic control lights, etc.), whereas other map data 312, 314 may be limited to road level map data with less granularity. In this regard, the autonomous driving map data 316 includes data or information that may be utilized by the ADS 320 to autonomously operate the vehicle including, but not limited to, assignments or associations between traffic lights and lanes, inferred lane lines, non-drivable lanes, construction information, geofencing, and other information that can be utilized for enhanced localization.

Similar to the navigation map data 312, in practice, the ADAS map data 314 and/or the autonomous driving map data 316 could be provided by any number of different third party suppliers or providers, or include or otherwise incorporate any number of different software applications or services provided by any number of different third party suppliers or providers, which could be accessed locally at the vehicle or remotely via a communications network (e.g., via a remote server or other cloud-based system), in any sort of format or protocol. In this regard, the navigation map data 312, the ADAS map data 314 and/or the autonomous driving map data 316 may be independent from one another, and the navigation map data 312, the ADAS map data 314 and/or the autonomous driving map data 316 may be associated with or otherwise provided by different sources, in different formats, using different protocols, and/or the like. Accordingly, the subject matter described herein is not limited to any particular relationship between the different sets of map data 312, 314, 316 or the respective sources, formats or protocols associated therewith.

Still referring to FIG. 3, in exemplary implementations, contiguous data points of the autonomous driving map data 316 that correspond to the same lane of a road are logically grouped or otherwise assigned to a respective lane segment that corresponds to a contiguous portion of a lane of a particular road. In this regard, a respective lane segment may correspond to a polygonal shape or region having a longitudinal dimension defined by the respective geographic locations (e.g., latitude and longitude) assigned to the respective georeferenced data points mapped to that respective segment and a lateral dimension defined by the lane boundaries, lane width, or other lane level map attributes associated with the respective data points assigned to the respective lane segment, resulting in a geographic area that encompasses the respective georeferenced data points assigned to the respective lane segment. In exemplary implementations, the lane mapping module 306 maps individual georeferenced route data points of the transformed set of georeferenced data points ahead of the current geographic location of the vehicle that define the upcoming trajectory of the route provided by the transformation module 304 to a corresponding lane segment having an associated geographic area that includes or otherwise encompasses the respective geographic location of the respective data point of the route. For example, the lane mapping module 306 may utilize the geographic location and road identification associated with a respective route data point ahead of the current geographic location of the vehicle to query the autonomous driving map data 316 to identify a respective lane segment of the identified road having an associated polygonal region with a geographic area that encompasses the geographic location associated with a respective route data point. In this manner, the lane mapping module 306 converts or otherwise maps the sequence of forward-looking (or upcoming) georeferenced route data points received from the transformation module 304 in the ADAS map domain into a corresponding sequence of lane segments for the upcoming trajectory of the route in advance of the current vehicle location.

In exemplary implementations, the lane mapping module 306 utilizes the mapped set of lane segments to automatically assign lane preference indicia to different lane segments at respective longitudinal positions along the upcoming trajectory of the route. In this regard, the lane mapping module 306 assigns a preferred lane indicator to the respective lane segments that are mapped to one or more route data points while assigning a non-preferred lane indicator to laterally adjacent lane segments at the respective longitudinal positions along the route. The lane mapping module 306 outputs or otherwise provides, to the guidance system 308, the lane preference indicia associated with the respective longitudinal positions along the upcoming trajectory of the route. The guidance system 308 autonomously operates one or more actuators onboard the vehicle to laterally maneuver the vehicle into the preferred lane segments at the respective longitudinal positions along the route using the lane preference indicia, and thereby, autonomously follows the route output by the navigation system 302 by virtue of the preferred lane segments being mapped to the data points for the upcoming trajectory of the route that were derived from the navigation information provided by the navigation system 302. For example, as described above, in one or more implementations, the guidance system 308 (e.g., guidance system 78) includes a motion planning module that generates a motion plan for controlling the vehicle as it traverses along the route, where a lateral solver module utilizes the lane preference indicia to generate a lateral motion plan output for controlling the lateral movement of the vehicle along the route to laterally maneuver the vehicle into preferred lanes, subject to any number of other different factors or variables during operation of the vehicle (e.g., traffic, detected objects or obstacles, lane closures or lane ending, road construction and/or the like). In this regard, the guidance system 308 may include or otherwise implement a lane change coordination system that utilizes the lane preference indicia to automatically determine whether or not to initiate a lane change or maintain the vehicle in the current lane of travel using other data or other information indicative of neighboring traffic or other obstacles (e.g., from sensor fusion system 74) in conjunction with the route information (e.g., road or turn identifications and the like) to maintain travel along the desired route. In this manner, the lateral component of the resulting motion plan or commanded (or planned) path output provided to the vehicle control system (e.g., vehicle control system 80) for autonomously controlling the vehicle actuators is influenced by the lane preference indicia along the route that was automatically assigned based on the mapped set of lane segments.

It should be noted that FIG. 3 depicts a simplified representation of the vehicle control system 300 for purposes of explanation and is not intended to be limiting. In this regard, although FIG. 3 depicts the transformation module 304, the lane mapping module 306 and the guidance system 308 as a separate or standalone components that are distinct from one another, in other implementations, one or more of the transformation module 304, the lane mapping module 306 and the guidance system 308 may be incorporated, integrated or otherwise implemented in connection with one another at the ADS 320 or another system onboard a vehicle. Moreover, the transformation module 304, the lane mapping module 306 and the guidance system 308 may include any number of different subcomponents or subsystems that are configurable to support the subject matter described herein. Additionally, it should be noted that one or more of the sets of map data 312, 314, 316 may be remotely located or otherwise external to the vehicle control system 300 and retrieved from a remote server or other remote entity over a communications network.

Figure 4:
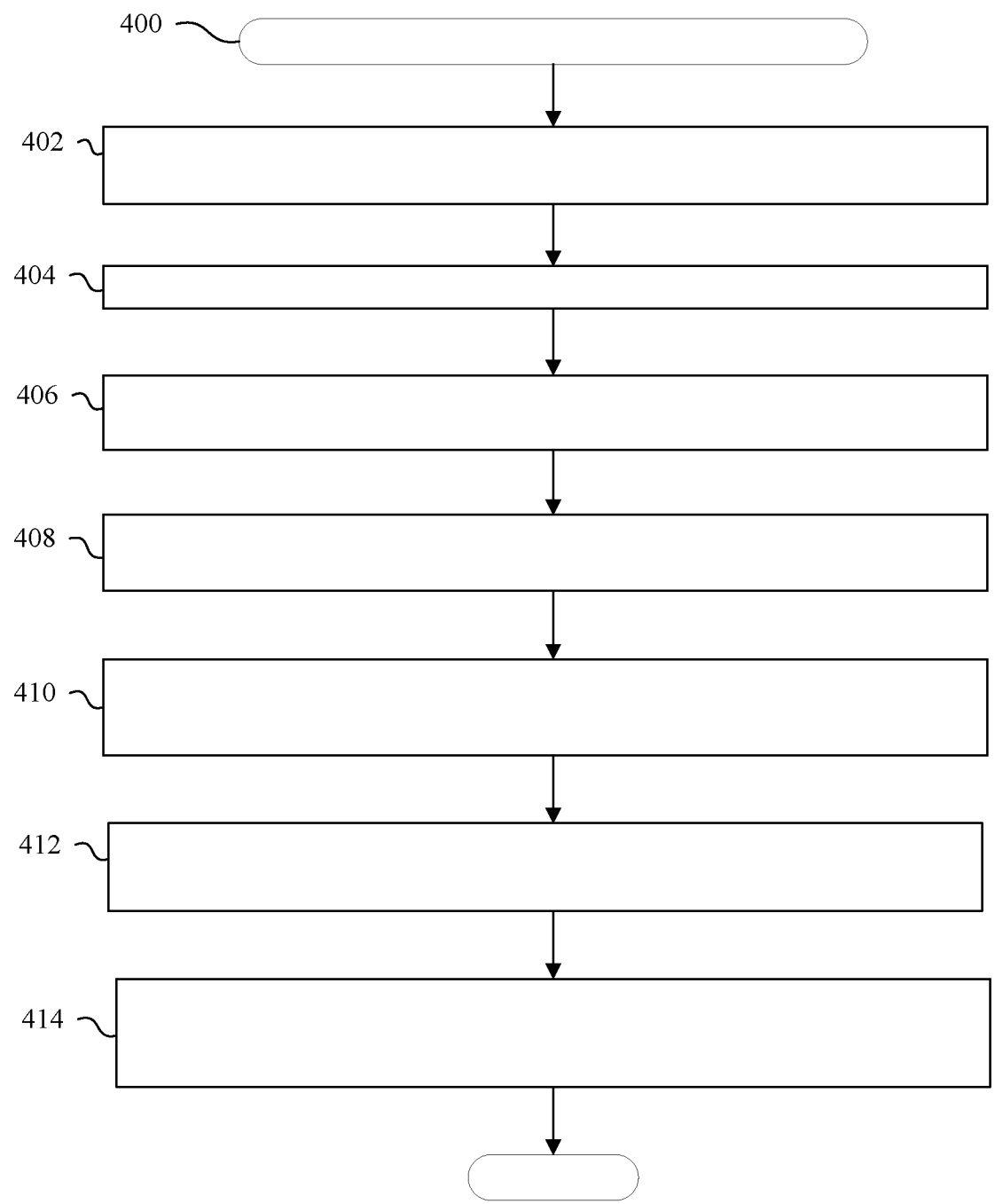
FIG. 4 depicts a flow diagram of an autonomous route following process suitable for implementation in connection with an ADS in in the autonomous vehicle control system of FIG. 1 according to one or more aspects described herein.

FIG. 4 depicts an exemplary implementation of an autonomous route following process 400 suitable for implementation by one or more control modules onboard a vehicle (e.g., by or in conjunction with an ADS 70, 320 supported by a controller 34 in the vehicle 10) to autonomously operate one or more actuators onboard the vehicle to change lanes in a manner that is influenced by the navigation information defining a desired route for the vehicle that is received from a navigation system, independent of the source, provider or format associated with the navigation system or the navigation information output thereby. For illustrative purposes, the following description may refer to elements mentioned above in connection with FIGS. 1-3. While portions of the autonomous route following process 400 may be performed by different elements of a vehicle system, for purposes of explanation, the subject matter may be primarily described herein in the context of the autonomous route following process 400 being primarily performed by the transformation module 304 and the lane mapping module 306 associated with the ADS 70, 320 implemented by the controller 34 associated with the vehicle 10.

The autonomous route following process 400 initializes or otherwise begins by receiving or otherwise obtaining navigation information including a set of data points defining an upcoming trajectory of a route for the vehicle from a navigation system at 402. As described above in the context of FIG. 3, the navigation information may be provided in any sort of format or resolution and be based on navigational map data 312 utilized by a particular provider, supplier or source associated with the navigation system 302. For example, in some implementations, the navigation system 302 may output or otherwise provide navigation information for the route in the form of sequential georeferenced data points along the route in a ADAS navigation format or another navigation format in compliance with an Advanced Drivers Assistant System Interface Specification (ADASIS) protocol. That said, in other implementations, the navigation information for the route may be provided in the form of turn cards or other turn-by-turn navigation that may include a set of sequential data points that indicate the direction to turn at a particular distance ahead of a preceding data point, which can be concatenated or otherwise combined to provide a set of sequential data points that define the route (e.g., based on turn directions and distance in concert with road identifiers). In this regard, depending on the particular navigation system 302 and corresponding format, the data points contained in the navigation information may range from relatively sparse to relatively dense, with an arbitrary or variable distance or travel time between successive data points.

The autonomous route following process 400 continues by receiving, obtaining or otherwise identifying a current operational context associated with the vehicle at 404 and calculating, determining or otherwise identifying a desired destination resolution or format for the navigation information to be received at the ADS based at least in part on the current operational context for the vehicle at 406. In this regard, the transformation module 304 receives or otherwise obtains, from one or more systems onboard the vehicle, real-time operational data or other contextual information identifying or otherwise characterizing the current operational context of the vehicle, such as, the current vehicle speed, the current road type, the current road curvature, the current vehicle mode, the current traffic, and/or the like. As described above in the context of FIG. 3, the current operational context of the vehicle may be utilized by the transformation module 304 to calculate or otherwise determine a desired geospatial resolution for the data points to define the upcoming trajectory of the desired route for the vehicle. For example, when the vehicle is currently being operated on a particular type or classification of road (e.g., non-highway) with a relatively greater curvature, in an area of relatively greater traffic, and/or the like, the transformation module 304 may determine that a higher resolution of georeferenced data points (e.g., increased density or reduced distance between successive data points) may be desired, while a lower resolution may be desired when the vehicle is operated on a relatively straight highway with lighter traffic. Additionally, in some implementations, the transformation module 304 may also analyze the upcoming trajectory of the route in connection with the current operational context to determine the desired resolution. For example, when the upcoming trajectory of the route includes one or more decision points (e.g., turns or other road identification or road type changes) within a threshold amount or time in advance of the current time and/or within a threshold distance of the current vehicle location or a preceding or subsequent decision point, the transformation module 304 may determine a higher resolution may be desired, while a lower resolution of georeferenced data points may be suitable when the upcoming trajectory of the route includes relatively few decision points or other navigational changes within the threshold horizon.

After analyzing the current operational context to determining the desired resolution or format, the autonomous route following process 400 converts or otherwise transforms the navigation information received from the navigation system into the desired destination format at 408 before transmitting the transformed navigation information to the ADS. As described above, in exemplary implementations, the transformation module 304 at the VCU 310 utilizes a set of ADAS map data 314 (or an ADAS map database) to translate or otherwise convert the sequential set of data points provided by the navigation system 302 in a navigation map domain or format associated with the navigation system 302 and/or the underlying source navigation map data 312 into a corresponding set of sequential georeferenced data points in the ADAS map domain by mapping individual data points from the navigation information from the navigation system 302 into corresponding georeferenced data points in the ADAS map data 314 before interpolating or downsampling in the ADAS map domain to arrive at a transformed set of sequential georeferenced data points that define the upcoming trajectory of the route in the ADAS map domain.

Still referring to FIG. 4, the autonomous route following process 400 maps data points of the transformed set of data points defining the upcoming trajectory of the route to corresponding lane segments defined by georeferenced data points in an autonomous driving navigational map domain at 410 and assigning lane preference indicia to corresponding longitudinal positions along the upcoming trajectory of the route based on the mapped lane segments at 412. For example, as described above, in exemplary implementations, contiguous data points of the autonomous driving map data 316 utilized by the ADS 70, 320 that correspond to the same lane of a road are logically grouped or otherwise assigned to a respective lane segment that corresponds to a contiguous portion of that lane of that particular road, resulting in polygonal lane segments that encompass the contiguous data points belonging to that segment of the lane of the road. The lane mapping module 306 selects an individual georeferenced data point of the transformed set of data points defining the upcoming trajectory of the route and utilizes the geographic location associated with the respective data point to query the autonomous driving map data 316 to identify the respective lane segment that encompasses the respective route data point. The lane mapping module 306 incrementally advances through the individual georeferenced data point of the transformed set of data points received from the transformation module 304 to identify different lane segments corresponding to the different individual georeferenced data points of the route. In this manner, the lane mapping module 306 effectively translates or otherwise transforms the sequence of georeferenced data points that define the upcoming trajectory of the route in the ADAS map domain into a corresponding sequence of lane segments in the autonomous driving map domain.

After identifying the lane segments defined in the autonomous driving map domain that correspond or otherwise map to the upcoming trajectory of the route received in the ADAS map domain, the lane mapping module 306 automatically assigns lane preference indicia to the mapped lane segments at the respective longitudinal positions along the route. In this regard, at a particular longitudinal position along the route, the mapped lane segment may be tagged or otherwise assigned a value or weighting for a preferred lane field or other indicator that designates the respective lane segment (and corresponding georeferenced data points in the autonomous driving map data 316 encompassed by the respective lane segment) as the preferred lane segment at the respective longitudinal position along the route, while laterally adjacent lane segments (and corresponding georeferenced data points in the autonomous driving map data 316 encompassed by the adjacent lane segments) are tagged or otherwise assigned a different value for the preferred lane field or other indicator that designates the adjacent lane segment(s) as non-preferred.

In some implementations, the lane mapping module 306 may assign Boolean lane preference indicia, for example, by setting the value for a preferred lane field or other indicator associated with the mapped lane segment to a first Boolean value (e.g., '1') that indicates the mapped lane segment is preferred while setting the value for the corresponding field or other indicator associated with laterally adjacent lane segments to a second Boolean value (e.g., '0') that indicates those other lane segments are not preferred. That said, in other implementations, the lane mapping module 306 may assign lane preference indicia on a graduated scale or within a continuous range of values that provide different gradations of lane preference to vary the timing or manner in which the lane preference indicia are utilized by the ADS 320 to laterally maneuver and navigate the vehicle. In such implementations, the lane preference indicia may vary depending on various factors, including, but not limited to the current speed of the vehicle, the estimated distance or travel time between the current location of the vehicle and the lane segment, the road type or other road configuration information, road or route complexity information, traffic, and/or the like. For example, a mapped lane segment closer to the current location of the vehicle situated on a curvier or more complex road with heavier may be assigned a relatively greater lane preference value (e.g., closer to 1) to increase the likelihood of the ADS 320 laterally maneuvering the vehicle into the preferred lane segment more expeditiously to maintain autonomous navigation of the vehicle along the desired route, while a lane segment further from the current location of the vehicle situated on a straighter road may be assigned a relatively lesser lane preference value (e.g., closer to 0) to relax or otherwise reduce constraints when or how the ADS 320 laterally maneuvers the vehicle into the preferred lane segment. In this regard, in some implementations, the lane preference indicia may dynamically vary to account for changes to the current operational context (e.g., changes in traffic, vehicle speed, etc.). In this regard, the subject matter described herein is not limited to any particular type or configuration of lane preference indicia.

In one or more implementations, the lane mapping module 306 utilizes the preferred lane segments identifiers to map, convert or otherwise transform the sequence of georeferenced data points in the ADAS map domain into corresponding georeferenced data points in the autonomous driving map domain that are associated with the preferred lane segments. In this manner, the lane mapping module 306 may convert the transformed sequence of georeferenced data points in the ADAS map domain to a higher resolution or density by identifying the corresponding georeferenced data points in the autonomous driving map domain that are associated with or otherwise encompassed by the preferred lane segments. In this regard, the sequence of georeferenced data points in the autonomous driving map domain corresponding to the preferred lane segments may include a georeferenced data point in the autonomous driving map domain at intervals of one meter or less between successive points in the longitudinal direction of travel, while the transformed sequence of georeferenced data points in the ADAS map domain received from the transformation module 304 is provided in a lower resolution (e.g., on the order of tens or hundreds of meters between successive data points in the longitudinal direction of travel).

At 416, the autonomous route following process 400 transmits or otherwise provides the lane preference indicia and transformed navigation information to the guidance system of the ADS for autonomous operation of the vehicle along the route. In this regard, the lane mapping module 306 provides navigation information defining the route along with the indicia of the preferred and non-preferred lane segments at the respective longitudinal positions along the route to the guidance system 78, 308, which, in turn, autonomously operates the vehicle to laterally maneuver into the preferred lane segments at respective longitudinal positions along the route, and thereby, autonomously follow the route determined by the navigation system 302. For example, the guidance system 78, 308 may receive the lane preference indicia along with the road identifiers and/or other attributes defining the upcoming trajectory to be utilized by the motion planning module to determine a corresponding motion plan for autonomously operating the vehicle. In some implementations, in addition to the road information, the lane mapping module 306 may also provide indicia of the sequence of georeferenced data points defining the upcoming trajectory of the route in the autonomous driving map domain corresponding to the preferred lane segments to the guidance system 78, 308, which, in turn, attempts to laterally maneuver the vehicle at respective longitudinal positions along the route to traverse the preferred lane segments, and thereby traverse the geographic locations associated with those respective data points in the autonomous driving map domain. That said, in other implementations, the guidance system 78, 308 may rely on the lane preference indicia to autonomously navigate the vehicle along the route without requiring the guidance system 78, 308 to receive georeferenced data points from the lane mapping module 306.

Referring to FIGS. 3-4, in one or more exemplary implementations, at 410, the lane mapping module 306 verifies or otherwise confirms the mapped sequence of lane segments provide a continuous connection of segments between the initial and final data points defining the upcoming trajectory of the route, and when a discontinuity exists between successive lane exists, the lane mapping module 306 implements or otherwise performs an interpolation strategy to identify additional lane segments to be designated as preferred for inclusion in the route, such that the sequence of preferred lane segments provides a continuously connected route. For example, even after the transformation module 304 interpolates between data points provided by the navigation system 302 to obtain a transformed sequence of georeferenced data points defining the upcoming trajectory in the ADAS map domain, one or more data points of the transformed set of georeferenced data points may fail to map to a particular road segment in the autonomous driving map domain, for example, due to road curvature or the amount of segmentation associated with the particular road.

When a discontinuity exists between successive mapped lane segments, in exemplary implementations, the lane mapping module 306 identifies all potential paths defined by different lane segments between the initial and final data points defining the upcoming trajectory of the route and then scores each potential path based on the amount of overlap or similarity to the previously mapped lane segments for the data points defining the upcoming trajectory of the route. For example, in one implementation, for each continuously connected segment in the potential path that corresponds to segment of successive map segments in the previously-mapped lane segments, the lane mapping module 306 may incrementally increase the score associated with that potential path, while for each continuously connected segment in the potential path that does not correspond to a corresponding segment of successive map segments in the previously-mapped lane segments, the lane mapping module 306 may incrementally decrease the score associated with that potential path. In this regard, the potential path between the initial and final data points defining the upcoming trajectory of the route having the highest assigned score corresponds to the potential path that best matches the path defined by the previously mapped lane segments, and therefore, is identified as the preferred path that provides a continuous connection of lane segments between the initial and final data points defining the upcoming trajectory of the route.

After identifying the preferred path of lane segments that best matches or maximizes the overlap with the previously mapped lane segments, the lane mapping module 306 automatically assigns lane preference indicia to the respective lane segments of the preferred path of lane segments, and thereby arrives at a sequence of preferred lane segments in the autonomous driving map domain that provides a continuously connected path for the upcoming trajectory for the vehicle. In this manner, the lane mapping module 306 refines or otherwise adjusts the mapped lane segments to provide continuity and thereby allow the lane preference indicia to continuously navigate the vehicle along the upcoming trajectory of the route. In various implementations, after arriving at a sequence of lane segments that correspond to the transformed navigation information for the route, the lane mapping module 306 may further refine or otherwise alter one or more lane segments based at least in part on the lane level attributes maintained in the autonomous driving map data 316 associated with the identified lane segments or other factors, such as, for example, current or real-time traffic or obstacle data, driver prompts or notifications, and/or the like. In this regard, it should be noted that the resulting preferred path of lane segments after interpolation does not necessarily include or encompass each and every georeferenced data point of the transformed set of georeferenced data points provided by the transformation module 304.

In one or more implementations, the autonomous route following process 400 continues fetching or otherwise retrieving navigation information and corresponding data points defining the upcoming trajectory of the route ahead of the current vehicle location to identify corresponding lane segments defined by georeferenced data points in the autonomous driving navigational map domain until filling up a corresponding buffer or otherwise reaching a calibratable threshold distance along the route ahead of the current vehicle location. The upcoming georeferenced data points ahead of the current vehicle location are then mapped to corresponding lane segments and then analyzed to verify or otherwise identify a continuous connection of preferred lane segments between the current vehicle location and the final fetched data point defining the upcoming trajectory of the route that is furthest ahead of the current vehicle location along the route. In some implementations, when the next turn or decision point is not within a threshold distance of a preceding turn or decision point, all potential lanes in the direction of travel may be assigned the same values for the lane preference indicia to allow the ADS 320 to autonomously change lanes as appropriate between turns or decision points without impairing route following.

By virtue of the autonomous route following process 400 and subject matter described herein, navigation information for a route is transformed or otherwise converted into a corresponding sequence of preferred lane segments that are continuously connected to reach the desired destination for the route. The preferred lane indicia allows for the ADS 70, 320 or guidance system 78, 308 associated with the vehicle to merely initiate lane changes into preferred lanes while correspondingly activating turn signals in an autonomous manner, and thereby provide the perceived function of autonomous route following, without requiring the navigation information for the route to be initially provided in an autonomous driving format or any other format or resolution. This allows for third-party providers or suppliers of navigation information to use any sort of underlying map data and provide the navigation information for the upcoming trajectory of the route in any suitable format capable of ingestion and transformation by the transformation module 304. The transformed set of data points generated by the transformation module 304 allows the lane mapping module 306 of the ADS 70, 320 to effectively overlay lane level autonomous driving map data 316 on the route to identify preferred and non-preferred lane segments and then establish a sequence of continuously connected preferred lane segments that provide a lane level route corresponding to the route determined by the navigation system 302. The transformed set of data points and preferred lane indicia can be utilized by the guidance system 78, 308 of the ADS 70, 320 to simply change lanes automatically at appropriate longitudinal positions along the route, thereby allowing the vehicle to ultimately reach the desired destination autonomously without reliance on georeferenced data points provided by the navigation system 302. This allows for the ADS 70, 320 to be interoperable with any number of different third-party navigation systems 302 without introducing additional requirements on the navigation system 302 to support autonomous driving. For example, basic road level connectivity or turn-by-turn navigation data points provided by projection-based navigation systems or other third-party application or services can be automatically transformed into a sequence of georeferenced data points and mapped to preferred lanes for autonomous driving independent of the navigation system.

While at least one exemplary aspect has been presented in the foregoing detailed description, it should be appreciated that a vast number of variations exist. It should also be appreciated that the exemplary aspect or exemplary aspects are only examples, and are not intended to limit the scope, applicability, or configuration of the disclosure in any way. Rather, the foregoing detailed description will provide those skilled in the art with a convenient road map for implementing the exemplary aspect or exemplary aspects. It should be understood that various changes can be made in the function and arrangement of elements without departing from the scope of the disclosure as set forth in the appended claims and the legal equivalents thereof.

What is claimed is:

1. A method of controlling a vehicle in an autonomous operating mode, the method comprising:
    obtaining navigation information comprising a sequential set of data points for a route for the vehicle from a navigation system in a navigation map domain;
    transforming the navigation information from the navigation map domain into a first set of georeferenced data points defining an upcoming trajectory of the route in an advanced driver-assistance system (ADAS) map domain by minimizing a distance between at least one point of sequential set of data points for the route in the navigation map domain and at least one georeferenced data point of the first set of georeferenced data points;
    mapping, by a controller associated with the vehicle, the first set of georeferenced data points to a corresponding set of lane segments ahead of a current vehicle location in an autonomous driving map domain having a higher density of georeferenced data points than the ADAS map domain, wherein the corresponding set of lane segments comprise a geographic area associated with a region defined by a plurality of georeferenced data points of autonomous driving map data assigned to a respective lane segment of the corresponding set of lane segments, the geographic area encompassing one or more georeferenced data points of the first set of georeferenced data points ahead of the current vehicle location, resulting in a mapped set of lane segments ahead of the current vehicle location in the autonomous driving map domain, wherein mapping the first set of georeferenced data points to the corresponding set of lane segments comprises identifying a respective lane segment of the mapped set of lane segments encompassing a respective data point of the first set of georeferenced data points by querying the autonomous driving map data using a geographic location associated with the respective data point ahead of the current vehicle location to identify the respective lane segment ahead of the current vehicle location having the geographic area that encompasses the geographic location associated with the respective data point, wherein the geographic area is associated with the region defined by the plurality of georeferenced data points of the autonomous driving map data assigned to the respective lane segment;
    automatically assigning, at the controller, lane preference indicia to the mapped set of lane segments, resulting in a sequence of preferred lane segments in the autonomous driving map domain that provides a continuously connected path for the upcoming trajectory of the route; and
    autonomously operating, by the controller, one or more actuators onboard the vehicle to maneuver the vehicle into one or more lanes at respective positions along the route corresponding to one or more respective lane segments of the mapped set of lane segments at the respective positions along the route in a manner that is influenced by the lane preference indicia assigned to the one or more respective lane segments of the sequence of preferred lane segments to autonomously follow the route.

2. The method of claim 1, wherein assigning the lane preference indicia comprises assigning a preferred lane indication to the respective lane segment encompassing the respective data point ahead of the current vehicle location.

3. The method of claim 2, wherein assigning the lane preference indicia further comprises assigning non-preferred lane indicia to a second lane segment laterally adjacent to the respective lane segment at a longitudinal position along the route corresponding to the respective data point ahead of the current vehicle location.

4. The method of claim 1, wherein transforming the navigation information comprises interpolating between data points of the navigation information using the ADAS navigation map data set to obtain a transformed set of georeferenced data points corresponding to the navigation information in an ADAS format.

5. The method of claim 4, wherein the data points of the navigation information comprise at least one of turn-by-turn navigation or road level connectivity.

6. The method of claim 1, further comprising determining, by a guidance system of the controller, a lateral motion plan for the vehicle based on the first set of georeferenced data points defining the upcoming trajectory of the route using the lane preference indicia, wherein autonomously operating the one or more actuators comprises autonomously operating the one or more actuators to laterally maneuver the vehicle into a lane associated with a respective lane segment of the mapped set of lane segments at a longitudinal position along the route corresponding to the respective lane segment in accordance with the lateral motion plan.

7. The method of claim 1, wherein:
the navigation information comprises turn-by-turn navigation in a first domain associated with a first navigation map data set;
the first set of georeferenced data points define the upcoming trajectory of the route in the ADAS map domain associated with a second navigation map data set different from the first navigation map data set; and
the first navigation map data set and the second navigation map data set are independent from one another.

8. The method of claim 1, wherein at least one of a source or a format associated with the navigation information is different from a second source or a second format associated with the first set of georeferenced data points.

9. A non-transitory computer-readable medium comprising executable instructions that, when executed by a processor, cause the processor to:
obtain navigation information comprising a sequential set of data points for a route for a vehicle from a navigation system in a navigation map domain;
transform the navigation information from the navigation map domain into a first set of georeferenced data points defining an upcoming trajectory of the route in an advanced driver-assistance system (ADAS) map domain by minimizing a distance between at least one point of sequential set of data points for the route in the navigation map domain and at least one georeferenced data point of the first set of georeferenced data points;
map the first set of georeferenced data points to a corresponding set of lane segments ahead of a current vehicle location in an autonomous driving map domain having a higher density of georeferenced data points than the ADAS map domain, wherein the corresponding set of lane segments comprise a geographic area associated with a region defined by a plurality of georeferenced data points of autonomous driving map data assigned to a respective lane segment of the corresponding set of lane segments, the geographic area encompassing one or more georeferenced data points of the first set of georeferenced data points ahead of the current vehicle location, resulting in a mapped set of lane segments ahead of the current vehicle location in the autonomous driving map domain, wherein mapping the first set of georeferenced data points to the corresponding set of lane segments comprises identifying a respective lane segment of the mapped set of lane segments encompassing a respective data point of the first set of georeferenced data points by querying the autonomous driving map data using a geographic location associated with the respective data point ahead of the current vehicle location to identify the respective lane segment ahead of the current vehicle location having the geographic area that encompasses the geographic location associated with the respective data point, wherein the geographic area is associated with the region defined by the plurality of georeferenced data points of the autonomous driving map data assigned to the respective lane segment;
automatically assign lane preference indicia to the mapped set of lane segments, resulting in a sequence of preferred lane segments in the autonomous driving map domain that provides a continuously connected path for the upcoming trajectory of the route; and
autonomously operate one or more actuators onboard the vehicle to maneuver the vehicle into one or more lanes at respective positions along the route corresponding to one or more respective lane segments of the mapped set of lane segments at the respective positions along the route in a manner that is influenced by the lane preference indicia assigned to the one or more respective lane segments of the sequence of preferred lane segments to autonomously follow the route.

10. The non-transitory computer-readable medium of claim 9, wherein assigning the lane preference indicia comprises assigning a preferred lane indication to the respective lane segment encompassing the respective data point.

11. The non-transitory computer-readable medium of claim 9, wherein transforming the navigation information comprises interpolating between data points of the navigation information using the ADAS navigation map data set to obtain a transformed set of georeferenced data points corresponding to the navigation information in an ADAS format.

12. The non-transitory computer-readable medium of claim 11, wherein the data points of the navigation information comprise at least one of turn-by-turn navigation or road level connectivity.

13. A vehicle comprising:
one or more actuators onboard the vehicle;
an electronic device including a transformation module to obtain navigation information comprising a sequential set of data points for a route in a navigation map domain and transform the navigation information from the navigation map domain into a first set of georeferenced data points defining an upcoming trajectory of the route in an advanced driver-assistance system (ADAS) map domain by minimizing a distance between at least one point of sequential set of data points for the route in the navigation map domain and at least one georeferenced data point of the first set of georeferenced data points;
a controller coupled to the electronic device and the one or more actuators that, by a processor, maps the first set of georeferenced data points to a corresponding set of lane segments ahead of a current vehicle location in an autonomous driving map domain having a higher density of georeferenced data points than the ADAS map domain, wherein the corresponding set of lane segments comprise a geographic area associated with a region defined by a plurality of georeferenced data points of autonomous driving map data assigned to a respective lane segment of the corresponding set of lane segments, the geographic area encompassing one or more georeferenced data points of the first set of georeferenced data points ahead of the current vehicle location, resulting in a mapped set of lane segments ahead of the current vehicle location in the autonomous driving map domain, automatically assigns lane preference indicia to the mapped set of lane segments, resulting in a sequence of preferred lane segments in the autonomous driving map domain that provides a continuously connected path for the upcoming trajectory of the route, and autonomously operates the one or more actuators to maneuver the vehicle into one or more lanes at respective positions along the route corresponding to one or more respective lane segments of the mapped set of lane segments at the respective positions along the route in a manner that is influenced by the lane preference indicia assigned to the one or more respective lane segments of the sequence of preferred lane segments to autonomously follow the route; and
data storage maintaining an autonomous driving map data set, wherein the mapping comprises the controller querying the autonomous driving map data set using a geographic location associated with the respective data point to identify a respective lane segment of the mapped set of lane segments having the geographic area that encompasses the geographic location associated with the respective data point, wherein the geographic area is associated with the region is defined by a plurality of georeferenced data points of the autonomous driving map data set assigned to the respective lane segment.

14. The vehicle of claim 13, wherein the controller includes a guidance system configurable to determine a lateral motion plan for the vehicle based on the first set of georeferenced data points defining the upcoming trajectory of the route using the lane preference indicia, wherein autonomously operating the one or more actuators comprises autonomously operating the one or more actuators to laterally maneuver the vehicle into a lane associated with a respective lane segment of the mapped set of lane segments at a longitudinal position along the route corresponding to the respective lane segment in accordance with the lateral motion plan.

15. The method of claim 1, wherein the navigation information comprises turn-by-turn navigation.

16. The method of claim 15, wherein the turn-by-turn navigation comprises turn cards.

17. The method of claim 1, wherein the navigation information comprises road level connectivity.

18. The method of claim 1, wherein the navigation information comprises an arbitrary or variable distance or travel time between successive data points.

19. The method of claim 18, wherein the navigation information comprises road level connectivity.

20. The method of claim 1, wherein the navigation system comprises a third party navigation system associated with a third party supplier.

* * * * *